(12) United States Patent
Cheung

(10) Patent No.: US 7,387,928 B2
(45) Date of Patent: Jun. 17, 2008

(54) DEVICE AND METHOD FOR MAKING AIR, GAS OR VACUUM CAPACITORS AND OTHER MICROWAVE COMPONENTS

(76) Inventor: William S. H. Cheung, Bellingdon Wayside Golders Green, London NW11, 8QY (GB)

(*) Notice: Subject to any disclaimer, the term of this patent is extended or adjusted under 35 U.S.C. 154(b) by 115 days.

(21) Appl. No.: 11/422,451

(22) Filed: Jun. 6, 2006

(65) Prior Publication Data

US 2007/0281421 A1    Dec. 6, 2007

(51) Int. Cl.
*H01L 21/8242* (2006.01)
(52) U.S. Cl. .............. 438/239; 438/106; 438/115; 438/118; 257/E21.008; 257/E21.011
(58) Field of Classification Search ......... 257/E21.513
See application file for complete search history.

(56) References Cited

U.S. PATENT DOCUMENTS 6,775,124 B2 *    8/2004    Cheung ..................... 361/326

2004/0087062 A1 *    5/2004    Ohuchi ....................... 438/126
2004/0154911 A1 *    8/2004    Burgess et al. .............. 200/512

* cited by examiner

*Primary Examiner*—Michael S. Lebentritt
*Assistant Examiner*—Cheung Lee
(74) *Attorney, Agent, or Firm*—Connolly Bove Lodge & Hutz LLP; Myron Keith Wyche

(57) ABSTRACT

A device and method for making a capacitor and other high frequency and/or microwave components. In particular, an air dielectric capacitor has a first electrode and a second electrode that are spaced apart, planar and each of a different size or area. The first electrode is a smaller, planar electrode that is sealed along its edge with a sealant having a constant dielectric to the second electrode, a larger planar electrode. The dielectric constant of the sealant along the edges of the first electrode is substantially uniform. In addition, an epoxy cover extends around the periphery of the smaller first electrode and is supported along the surface of the larger second electrode.

8 Claims, 4 Drawing Sheets

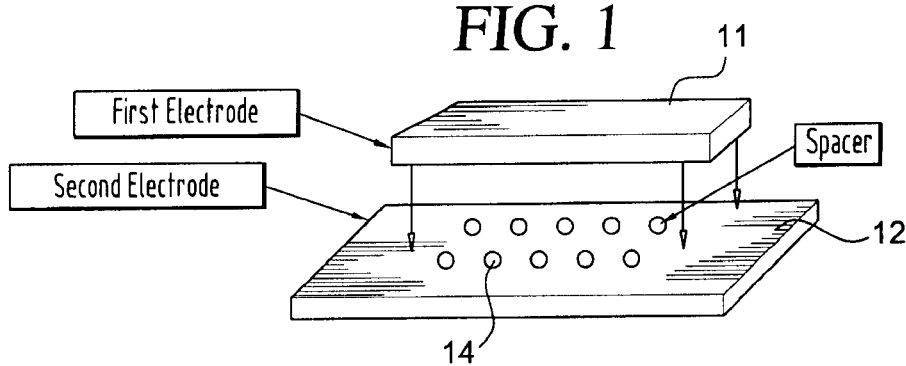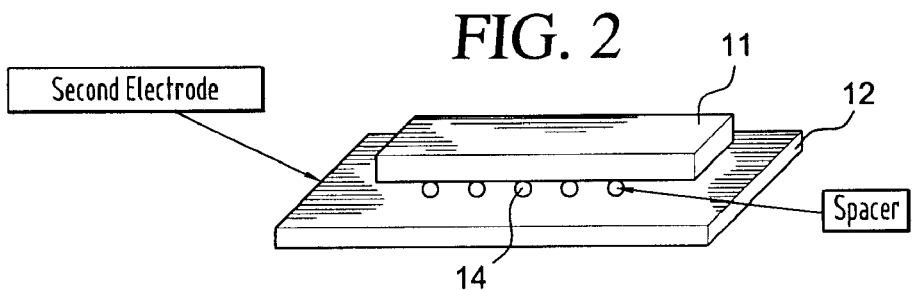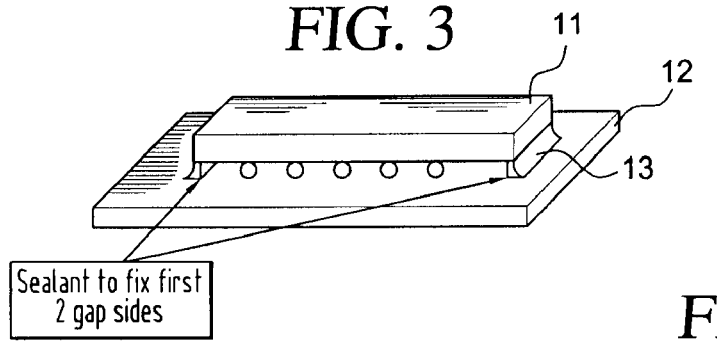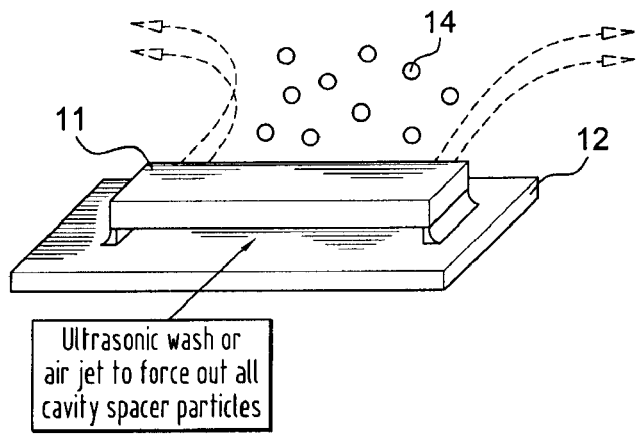

DEVICE AND METHOD FOR MAKING AIR, GAS OR VACUUM CAPACITORS AND OTHER MICROWAVE COMPONENTS

BACKGROUND OF THE INVENTION

The present invention relates to electrical capacitors and other components for high frequency and/or microwave circuit applications. Specifically, an air, gas or vacuum filled capacitor is described for use in applications up to and including millimeter wavelengths having a stable capacitance with a low radio frequency signal losses.

Radio communication services are becoming so numerous they are reaching the 50 GHz millimeter wave spectrum. As the demand for more telecommunications services increases, and the spectrum becomes increasingly crowded, it is foreseeable that applications in the 50-100 GHz millimeter wave spectrums will be utilized for various telecommunications applications.

Circuits for generating and processing signals in the millimeter wave spectrum present significant challenges to component designers. As the frequencies increase, the quality of the components becomes increasingly difficult to maintain. Specifically, for a basic capacitor utilized in circuits operating at these frequencies, the internal equivalent series resistance (ESR) increases significantly using known dielectrics and construction techniques for microwave capacitors. Upper frequency spectrum applications in UHF (300 MHz to 3.0 GHz) to SHF (3 GHz to 30 GHz) are limited because dielectric materials used in the capacitors exhibit a significant change in ESR with frequency. As the frequency increases for a typical high frequency capacitor, the ESR can increase from 0.05 ohm at 200 MHz to significantly higher ESR and higher losses can be expected. Additionally, the dielectric constant $\epsilon$ also changes as frequencies increase. Thus, capacitors in particular have a practical upper limit in UHF to SHF frequency spectrum when they are constructed with conventional dielectric materials.

One of the more advantageous dielectrics is air. Early capacitor designs used in relatively low RF frequency applications (e.g., 100 KHz to 30 MHz) employed air capacitors particularly for high-powered applications. These capacitors were physically large because of the range of the capacitance values (e.g., 20 pF to 800 pF) that are often required to work at lower RF frequencies. However, in order to stand higher working voltages, it is necessary to increase the distance between electrodes. Consequently, the use of air, gas or a vacuum as a dielectric has not seen widespread use outside of the lower RF frequency applications.

Capacitors that utilize air, gas or a vacuum as a dielectric approach the theoretical performance of an ideal capacitor. That is, such capacitors have no losses and a dielectric constant ($\epsilon$) which remains constant over an extremely wide frequency spectrum up to SHF range (i.e., 3 GHz to 30 GHz). The power factor for low RF frequency gas/vacuum dielectric background art capacitors is low, making them suitable for carrying high current/working voltage levels. In the event of an internal breakdown due to an excessive voltage producing a flash over between capacitor electrodes, the dielectric is self-healing. That is, the dielectric is not destroyed or altered as a result of a voltage arc generated between the electrode plates. Further, it is well known with many dielectric materials used in background art capacitor applications, an air, gas or vacuum dielectric will not suffer from aging and degradation in performance over time.

An additional difficulty in using background art capacitor designs at millimeter wavelength frequencies (e.g., Extremely High Frequency (EHF)) is that most of these capacitors have leads with wire length, or an end cap attachment that introduces significant inductance in the circuit, as well as series circuit resistance. In a typical microwave application, the capacitor electrodes are connected by directly bonding or soldering the device to a printed circuit board (PCB) trace. However, even with these connection techniques disadvantageous series inductance and resistance can be introduced to microwave circuit. Therefore, there is a need for an implementation of air, gas or vacuum filled dielectric capacitor that can be used in the above-discussed RF frequency applications and up to the EHF frequency range (30 GHz to 300 GHz).

BRIEF SUMMARY OF THE INVENTION

The present invention is a device and method for making an air, gas or vacuum dielectric device. The device of the present invention comprising: a first electrode; a second electrode; a sealant; and an epoxy cover, wherein the first electrode and the second electrode are initially separated by the spacers, and the sealant material is configured to seal a plurality of edges of the first electrode to the second electrode. The first electrode and second electrode of the present invention may be planar and have different sizes or areas (e.g., a smaller electrode and a larger electrode). In particular, a plurality of edges of the smaller of the two planar electrodes is connected by the sealant to the larger electrode. The sealant has a dielectric constant whereby the dielectric constant along the plurality of edges of the smaller electrode remains substantially uniform.

In particular, one embodiment of the invention is a capacitor device, comprising: a first electrode; a second electrode; a sealant; spacers; and an epoxy cover, wherein the first electrode and the second electrode are initially separated by the spacers, and the sealant material is configured to seal a plurality of edges of the first electrode to the second electrode.

Preferably, in the device of the present embodiment, the first electrode and the second electrode are planar and the first electrode is smaller than the second electrode. In addition, preferably the sealant has a dielectric constant E that has a substantially uniform value along the plurality of edges of the first electrode. Further, preferably in the present embodiment, the first electrode and second electrode are copper; and the spacers have the form of micro-spheres. Alternatively, the spacers may be, but are not limited to a single spacer sheet. Moreover, preferably in the present embodiment, the epoxy cover extends around the periphery of said first electrode and is supported along an exposed surface above said second electrode.

Another embodiment of the present invention is a method for making a device. In a method of the present invention, the electrodes are separated by spacers that are removed once a first set of the plurality of edges of the smaller of the two planar electrodes has been sealed to the larger electrode so the electrodes are fixed in place. Following the removal of the spacers, the remaining edges of the two planar electrodes are sealed. An epoxy cover is then added to the device that extends around the periphery of the smaller planar electrode and is supported along the surface of the larger electrode which is not facing the smaller electrode.

Further, in the method for making discussed above, the device is an air, gas or vacuum dielectric capacitor, wherein two electrodes are separated with silica spacers that establish a predetermined electrical capacitance between the electrodes. Sealant is applied to two opposite ends of the electrodes to fix the electrodes at a spacing formed by the spacers. The electrodes may comprise copper or any other well known conductive material. The spacers are then removed, and the electrodes are held in place with respect to each other by the sealant. Once the spacers are removed, the remaining edges of the plurality of edges of the smaller electrode and larger electrode can be fixed in place with the sealant. Next, an epoxy cover may be advantageously formed around the periphery of the electrodes.

In particular, the present embodiment is a method for making a device comprising: separating a first electrode and second electrode with spacers to establish a predetermined spacing d between said electrodes; applying a sealant to a plurality of opposite edges of said first electrode to fix spacing between the first electrode and second electrode provide by said spacers; removing said spacers once said first electrode and second electrode are fixed with respect to each other; sealing the remaining plurality of edges of the first electrode to said second electrode with said sealant such that said space d and common area A between the first electrode and second electrode remains free from contamination; and forming an epoxy cover around the periphery of the first electrode and above an exposed surface of the second electrode.

Preferably, in the present embodiment a vacuum capacitor is formed by, after sealing the remaining plurality of edges of the first electrode to said second electrode with said sealant such that said space d and common area A between the first electrode and second electrode, drawing a vacuum between the space d and area A common to the first electrode and second electrode. Alternatively, in the present embodiment a gas capacitor is formed by, after sealing the remaining plurality of edges of the first electrode to said second electrode with said sealant such that said space d and common area A between the first electrode and second electrode, inserting a gas between the space d and area A common to the first electrode and second electrode.

Yet another embodiment of the present invention is a method for making a device comprising: separating a first electrode and second electrode with a spacer sheet to establish a predetermined spacing d between said electrodes; applying a sealant to a plurality of opposite edges of said first electrode to fix spacing between the first electrode and second electrode provide by said spacer sheet; removing said spacer sheet once said first electrode and second electrode are fixed with respect to each other; sealing the remaining plurality of edges of the first electrode to said second electrode with said sealant such that said space d and common area A between the first electrode and the second electrode remains free from contamination; and forming an epoxy cover around the periphery of said first electrode and above an exposed surface of said second electrode.

Preferably, in the present embodiment, a vacuum capacitor is formed by, after sealing the remaining plurality of edges of the first electrode to said second electrode with said sealant such that said space d and common area A between the first electrode and second electrode, drawing a vacuum between the space d and area A common to the first electrode and second electrode. Alternatively, in the present embodiment, a gas capacitor is formed by, after sealing the remaining plurality of edges of the first electrode to said second electrode with said sealant such that said space d and common area A between the first electrode and second electrode, inserting a gas between the space d and area A common to the first electrode and second electrode.

Alternatively, the device and methods of the present invention can be applied to producing additional RF microwave components. Non-limiting example of such components would include air or vacuum dielectric transmission lines, hybrid ring circulators, microwave low pass filters, transmission line impedance matching filters and other well-known stripline components.

BRIEF DESCRIPTION OF THE DRAWINGS

FIG. 1 shows a first process step of positioning two electrodes for forming a capacitor;

FIG. 2 shows the first electrode and second electrode being brought into facing relationship and separated by spacers;

FIG. 3 shows how a plurality of opposite edges of the first electrode are sealed to the second electrode;

FIG. 4 shows the removal of spacers once the plurality of opposite edges of a first electrode has been fixed to the second electrode;

DESCRIPTION OF THE PREFERRED EMBODIMENTS

Figure 5:
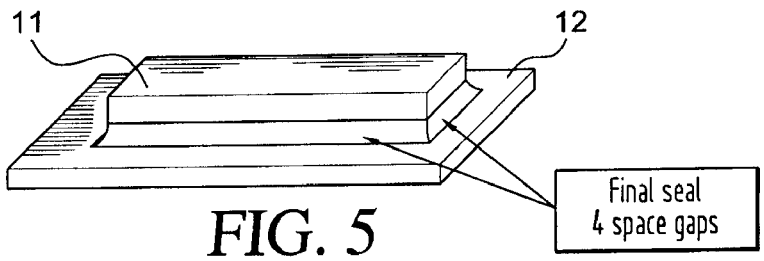
FIG. 5 shows the step of sealing the remaining plurality of edges of the first electrode to the second electrode.

The fundamental formula for a capacitor having 2 planar parallel electrodes/plates separated by a dielectric material is:

$$C = 0.0885 \epsilon A/d \tag{1}$$

where C is the capacitance in picofarads (pF);

$\epsilon$ is the dielectric constant;

A is the area common to both electrodes in, for example, centimeters; and d is the distance or spacing between the electrodes in, for example, centimeters.

In practice, the dielectric constant c is determined by the material between the electrodes of the capacitor. Many common dielectric materials used in capacitors designed for lower frequency operations exhibit a significant change in dielectric constant $\epsilon$ as well as higher losses as the frequency increases. That is, the value of the dielectric constant $\epsilon$ is a function of frequency. At low frequencies, having a dielectric material with a high dielectric constant $\epsilon$ produces greater capacitance for the size of the component. At higher frequencies, the internal equivalent series resistance (ESR) and lead inductance losses also increase as frequencies increases and degrades the quality of the capacitive component.

Air has a dielectric constant of 1 which is substantially frequency invariant. Thus, as the frequency of the signal through the capacitor increases, the capacitor exhibits substantially the same capacitance without any significant increases in ESR losses. However, lowering the dielectric constant $\epsilon$ to 1 reduces the capacitance value obtainable for a capacitor of a given size. Alternatively, capacitances in the range of 0.5-100 pF can be achieved using a gas dielectric or a vacuum dielectric at millimeter wavelengths.

As an example, typical capacitors for use in the millimeter wave frequency range may have a common electrode surface area A and spacing d as shown in TABLE 1.

TABLE 1

| | | Spacer Size | | | | |
|---|---|---|---|---|---|---|
| | | 3 | 5 | 6 | 8 | 10 (micron) |
| Electrode Size | 5 × 5 mm | 73.73 | 44.25 | 56.88 | 27.66 | 22.13 (pF) |
| | 4 × 4 | 47.20 | 28.30 | 23.60 | 17.70 | 14.16 |
| | 3 × 3 | 26.55 | 15.93 | 13.28 | 9.96 | 7.98 |
| | 2 × 2 | 11.8 | 7.08 | 5.90 | 4.43 | 3.54 |
| | 1 × 1 | 2.95 | 1.77 | 1.48 | 1.11 | 0.89 |

The top line of TABLE 1 shows spacing between electrodes of 3, 5, 6, 8 and 10 microns. For the given spacing between electrodes and with an air dielectric, the capacitor electrode size is also shown in TABLE 1. For instance, square capacitor structures between 1×1 mm and 5×5 mm are shown with values of capacitance from 0.89 pF −73.73 pF, respectively.

Referring now to FIG. 1, the relative positioning between the first electrode 11 and second electrode 12 are shown. In the exemplary embodiment of FIG. 1, first electrode 11 is rectangular in shape, as is second electrode 12. In addition, first electrode 11 is smaller in length and width than second electrode 12. However, the present invention is not limited to electrodes of a specific shape or size.

As shown in FIG. 1, the two electrodes are maintained at a constant distance apart by a plurality of micro-sphere spacers 14. However, the spacers may comprise any shape, size or material that can be used to provide the spacing d between the first electrode and second electrode with common area A in order to achieve a desired capacitance C with a dielectric constant $\epsilon$, as discussed above in the capacitance formula (1). TABLE 1 gives exemplary spacers sizes for millimeter wave applications.

FIG. 2 shows the first electrode 11 and the second electrode 12 being brought into a facing relationship, and separated by the spacers 14. The spacers 14 may be comprised of, but are not limited to: silica material or any other well known materials used to separate electrodes. Once the first electrode 11 and second electrode 12 are spaced appropriately by the spacers 14, the gap between a plurality of opposite edges of the first electrode 11 are bonded to the surface of the second electrode 12 with a sealant 13, as shown in FIG. 3. The silica micro-sphere spacers 14, shown in exemplary FIG. 4, are removed once the sealant 13 hardens fixing the spacing d between the two planer electrodes 11, 12 with respect to each other. The sealant 13 may be an epoxy resin or any other material that both seals and provides a desired dielectric constant $\epsilon$.

As FIG. 4 show, the spacers 14 can be removed so that no material remains between the two planer electrodes 11 and 12. The spacer removal can be performed by, for example, but not limited to: airs jet and electro-sonic wash. Following the removal of the spacers 14, the remaining edges of the first electrode 11 are bonded with sealant to the second electrode 12 so as to form an enclosed case containing air as a dielectric.

Figure 6:
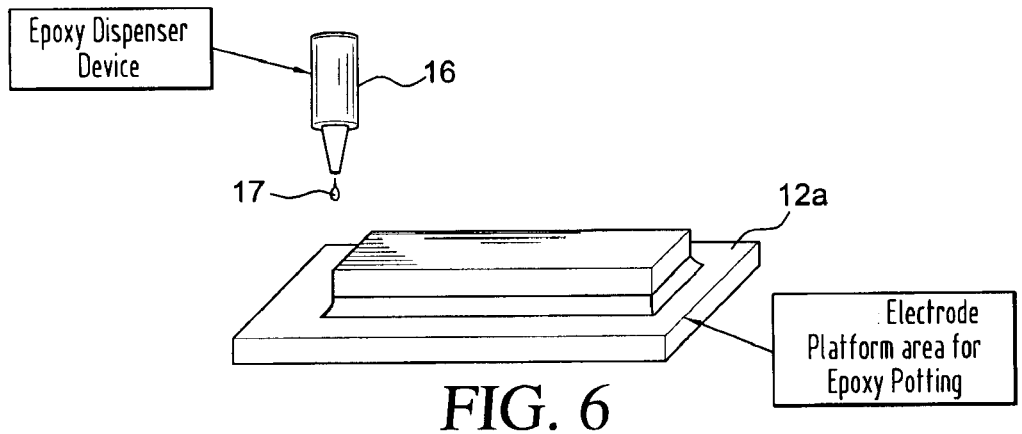
FIG. 6 shows the area above the second electrode and around the periphery of the first electrode.
Figure 7:
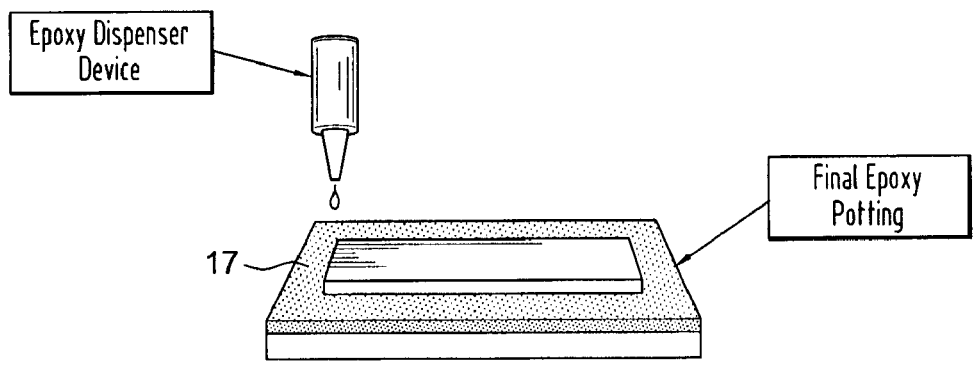
FIG. 7 shows the formation of an epoxy cover around the periphery of the first electrode.

With the first electrode 11 and second electrode 12 bonded together, an additional epoxy cover 17 may be formed over the second electrode 12 and extending around the periphery of the first electrode 11. As shown in FIG. 6, drops of an epoxy potting compound are deposited on the surface of the second electrode 12 outside of the sealed space formed with the first electrode 11. The epoxy dispenser 16 deposits enough epoxy in the area 12a above the second electrode 12 so that a durable final epoxy potting ridge is formed around the first electrode 11, as shown in the side view of FIG. 7.

Figure 8:
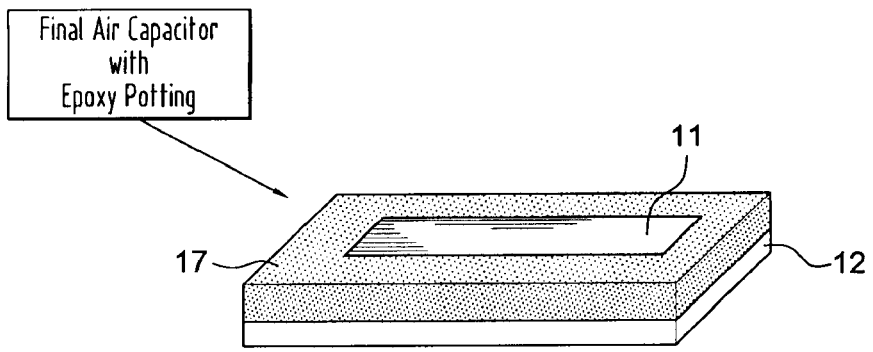
FIG. 8 shows a completed capacitor with the final epoxy cover around the periphery of the first electrode and supported by the second electrode.

As shown in exemplary embodiment of FIG. 8, the finished capacitor has a rectangular configuration with the plurality of sealed edges of the first electrode 11 and second electrode 12 protected by the epoxy cover 17. Electrical connections can be made by electrically connecting the first electrode 11 and second electrode 12 directly to a circuit trace of a circuit board. Examples of means of electrically connecting include, but are not limited to: soldering and bonding.

Figure 9:
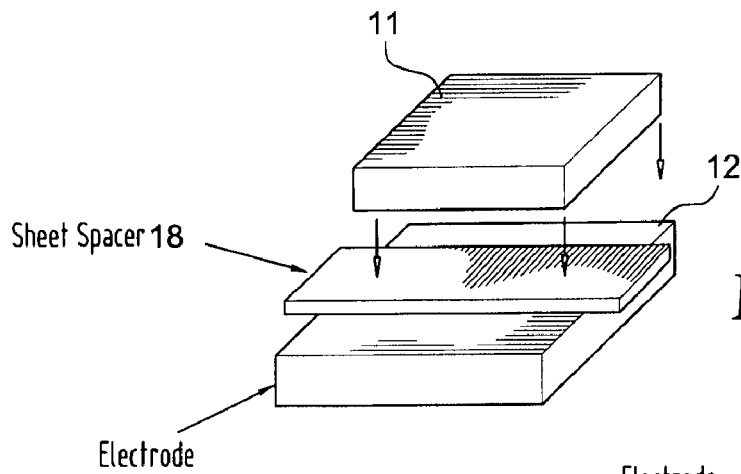
FIG. 9 shows the first electrode and second electrode being brought into facing relationship and separated by a spacer sheet in another embodiment of the invention.

FIG. 9 is an exemplary alternative embodiment of the invention. As shown in FIG. 9, the two electrodes are maintained at a constant distance apart by a spacer sheet 18. The spacer sheet may comprise any shape, size or material that can be used to provide the spacing d between the first electrode 11 and second electrode 12 with common area A in order to achieve a desired capacitance C with a dielectric constant $\epsilon$, as discussed above in the capacitance formula (1). As discussed above, TABLE 1 gives exemplary spacers sizes for millimeter wave applications.

Figure 10:
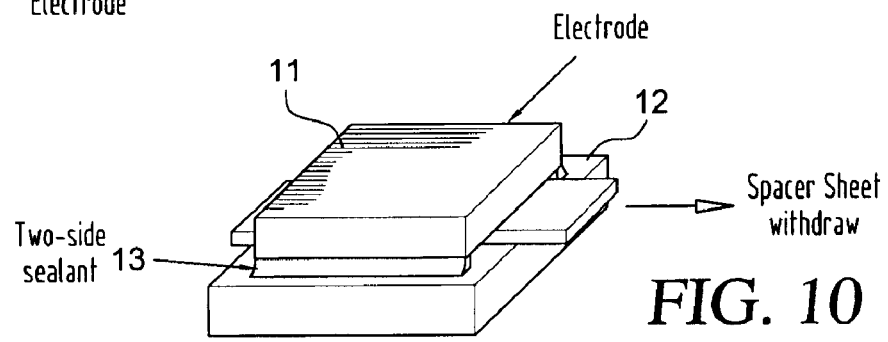
FIG. 10 shows how a plurality of opposite edges of the first electrode are sealed to the second electrode with a sealant and the removal of the spacer sheet.

FIG. 10 shows the first electrode 11 and the second electrode 12 being brought into a facing relationship, and separated by the spacer sheet 18. The spacers 14 may be comprised of, but are not limited to: silica material or any other well known materials that can be used to separate electrodes. Once the first electrode 11 and second electrode 12 are spaced appropriately by the spacer sheet 18, the gap between a plurality of opposite edges of the first electrode 11 are bonded to the surface of the second electrode 12 with a sealant 13, as shown in FIG. 10. The spacer sheet 18, shown in exemplary FIG. 10, is removed once the sealant 13 hardens fixing the spacing d between the two planer electrodes 11, 12 with respect to each other. The sealant 13 may be an epoxy resin or any other material that both seals and provides a desired dielectric constant $\epsilon$.

Figure 11:
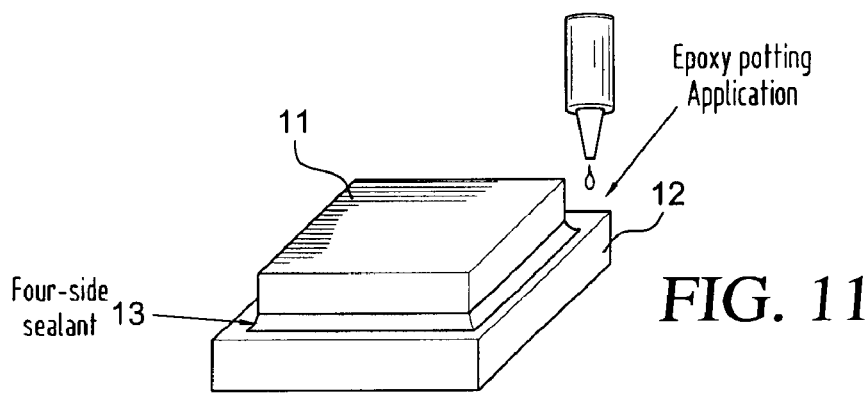
FIG. 11 shows the area above the second electrode and around the periphery of the first electrode subject to epoxy potting that forms an epoxy cover.

As FIG. 11 shows, following the removal of the spacer sheet 18, the remaining plurality of edges of the first electrode 11 are bonded with sealant 13 to the second electrode 12 so as to form an enclosed case containing air as a dielectric.

With the first electrode 11 and second electrode 12 bonded together, an additional epoxy cover 17 may be formed over the second electrode 12 and extending around the periphery of the first electrode 11. As shown in FIG. 11, drops of an epoxy potting compound are deposited on the surface of the second electrode 12 outside of the sealed space formed with the first electrode 11. The epoxy dispenser 16 deposits enough epoxy in the area above the second electrode 12 so that a durable final epoxy potting ridge is formed around the first electrode 11, as shown in the side view of FIG. 12.

Figure 12:
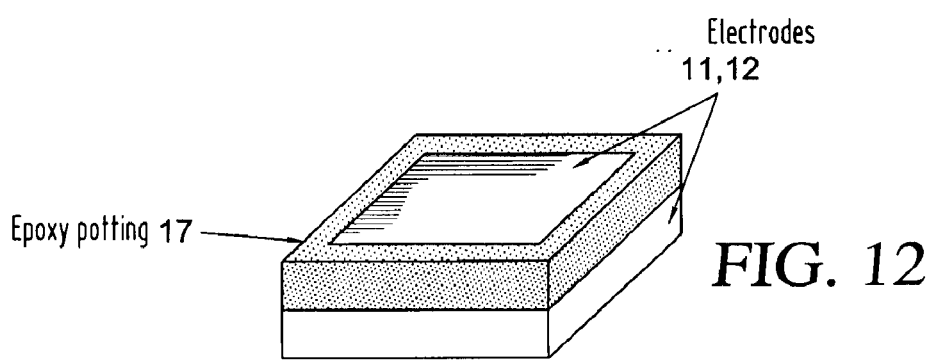
FIG. 12 shows a completed capacitor with the final epoxy cover around the periphery of the first electrode and supported by the second electrode.

As shown in exemplary embodiment of FIG. 12, the finished capacitor has a rectangular configuration with the plurality of sealed edges of the first electrode 11 and second electrode 12 protected by the epoxy cover 17. Electrical connections can be made by electrically connecting the first electrode 11 and second electrode 12 directly to a circuit trace of a circuit board. Examples of means of electrically connecting include, but are not limited to: soldering and bonding.

Figure 13:
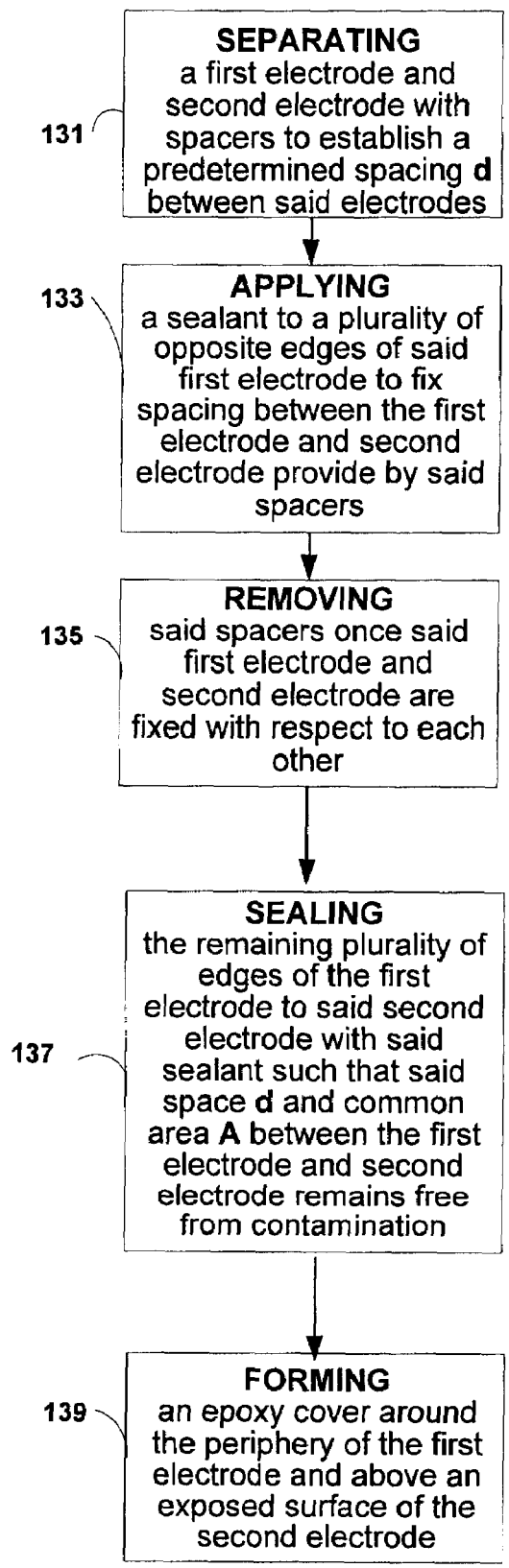
FIG. 13 shows an exemplary flow diagram for a method for making a capacitor.

FIG. 13 shows an exemplary flow diagram for a method for making a capacitor. Step 131 of FIG. 13 is separating a first electrode and second electrode with spacers to establish a predetermined spacing d between said electrodes. In step 133, a sealant is applied to a plurality of opposite edges of said first electrode to fix spacing between the first electrode and second electrode provide by said spacers. Step 135 involves removing the spacers once said first electrode and second electrode are fixed with respect to each other. In step 137, the remaining plurality of edges of the first electrode are sealed to said second electrode with the sealant such that said space d and common area A between the first electrode and second electrode remains free from contamination. Step 139 of FIG. 13 is forming an epoxy cover around the periphery of the first electrode and above an exposed surface of the second electrode. Alternatively, a spacer sheet may be used with the above described method.

In addition, those skilled in the art will recognize that in accordance with U.S. Pat. No. 6,775,124 (i.e., '124 patent), the entire contents of which are incorporated by reference, the above-discussed device and method can provide a vacuum capacitor where a vacuum can be drawn between the space d and area A common to first electrode 11 and second electrode 12 forming a vacuum capacitor with the present invention discussed above. Alternatively, in accordance with the '124 patent, the above-discussed device and method can provide a gas capacitor where a gas can be inserted within the space d area A common to first electrode 11 and second electrode 12. The alternative embodiments of an air, vacuum or gas vacuum capacitor for the present invention are selected to supply an appropriate dielectric constant $\epsilon$ and capacitance value C that provides the required performance in accordance with a desired application.

Beyond capacitors, additional components can be implemented with the device and methods of the present invention discussed above. For example, with regard to transmission lines, the present invention can be used to implement parallel strips/striplines components with electrodes having an air, gas or vacuum dielectric between the electrodes. As discussed above, since an air dielectric in particular has no practical limitations with respect to RF losses, these transmission line devices may be developed well into the upper GHz frequency spectrum. Thus, the present invention can also be used to provide low loss transmission lines well into the high GHz frequency range.

Another application of the present invention is the implementation of transmission stripline impedance matching transformers. For example, the present invention can be used to implement a $\lambda/4$ transmission line requiring an impedance $Z_m$. That is, a transmission line can be implemented with the device and methods of the present invention that can be used as an impedance transformer to match $Z_{in}$ to $Z_{out}$. A $\lambda/4$ transmission line impedance matching transformer has been implemented in prototype form with the device and methods of the present invention. Yet another application of the above-discussed invention is a microwave low pass filter. In particular, the planar stripline electrodes discussed above can be used as microwave low pass filters with air or vacuum dielectrics between the parallel electrodes.

In addition, to the transmission line applications discussed above, yet another application for the present invention is the implementation of a ring circulator. In particular, a ring circulator is a ring transmission line directional coupler that can be used to sample RF signals that are traveling in different directions inside the ring. A 1.5$\lambda$ microwave, 3 dB Hybrid Ring Circulator has been implemented in prototype form using the device and methods of the present invention. The ring circulator is a very useful component for a variety of applications including, but not limited to: signal power splitting; signal combining; and signal mixers.

As yet another example of an application of the present invention, low values of inductors (i.e., 0.1 nH to 0.9 nH) can be produced with the device and methods discussed above. In particular, a $\lambda/8$ length transmission line with a short circuit at the far end will resemble an inductor at an open ened. The equivalent or virtual inductance of the $\lambda/8$ length transmission line at a wavelength ($\lambda_o$)/frequency ($f_o$) of interest is given by the following formula:

$$L=Z_o/(2*\pi*f_o) \qquad (2)$$

where the inductance is L; the characteristic impedance is $Z_o$; and the frequency of interest is $f_o$ From equation (2), the virtual value of the $\lambda/8$ transmission line inductance is a function of the actual line characteristic impedance $Z_o$. That is, by controlling the characteristic line impedance $Z_o$, with the device and methods of the present invention, one can arrive at a desired low inductance value.

As a practical example of the above, if the target low inductance L is 0.2 nH at a frequency of interest $f_o$ of 3 GHz, by using equation (2), the required $\lambda/8$ line impedance required create the characteristic line impedance $Z_o$ would be 3.77 ohms. The final inductor, with a characteristic impedance $Z_o$ of only 3.77 ohms, must have a very stable characteristics and not be affected by the circuit surroundings. The device and methods of the present invention provides these characteristics at a wide range of RF frequencies.

As a practical example of the above, if the target low inductance L is 0.2 nH at a frequency of interest $f_o$ of 3 GHz, by using equation (2), the required $\lambda/8$ line impedance required create the characteristic line impedance $Z_o$ would be 3.77 ohms. The final inductor, with a characteristic impedance $Z_o$ of only 3.77 ohms, must have a very stable characteristics and not be affected by the circuit surroundings. The device and methods of the present invention provides these characteristics at a wide range of RF frequencies.

The foregoing description of the invention illustrates and describes the present invention. Additionally, the disclosure shows and describes only the preferred embodiments of the invention in the context of an air, gas or vacuum capacitor and method for making an air, gas or vacuum capacitor, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the

What is claimed as new and desired to be protected by Letters Patent of the United States is:

1. A method for making a device comprising:
   separating a first electrode and second electrode with spacers to establish a predetermined spacing d between said electrodes;
   applying a sealant to a plurality of opposite edges of said first electrode to fix spacing between the first electrode and second electrode provide by said spacers;
   removing said spacers once said first electrode and second electrode are fixed with respect to each other;
   sealing the remaining plurality of edges of the first electrode to said second electrode with said sealant such that said space d and common area A between the first electrode and second electrode remains free from contamination; and
   forming an epoxy cover around the periphery of the first electrode and above an exposed surface of the second electrode.

2. The method of claim 1, wherein the device is a vacuum capacitor formed by,
   after sealing the remaining plurality of edges of the first electrode to said second electrode with said sealant such that said space d and common area A between the first electrode and second electrode,
   drawing a vacuum between the space d and common area A to the first electrode and second electrode.

3. The method of claim 1, wherein the device is a gas capacitor formed,
   after sealing the remaining plurality of edges of the first electrode to said second electrode with said sealant such that said space d and common area A between the first electrode and second electrode,
   inserting a gas between the space d and common area A to the first electrode and second electrode.

4. The method of claim 1, wherein the device is at least one of a capacitor, inductor, impedance transformer, ring circulator and stripline component.

5. A method for making a device comprising:
   separating a first electrode and second electrode with a spacer sheet to establish a predetermined spacing d between said electrodes;
   applying a sealant to a plurality of opposite edges of said first electrode to fix spacing between the first electrode and second electrode provide by said spacer sheet;
   removing said spacer sheet once said first electrode and second electrode are fixed with respect to each other;
   sealing the remaining plurality of edges of the first electrode to said second electrode with said sealant such that said space d and common area A between the first electrode and the second electrode remains free from contamination; and
   forming an epoxy cover around the periphery of said first electrode and above an exposed surface of said second electrode.

6. The method of claim 5, wherein the device is a vacuum capacitor is formed by, after sealing the remaining plurality of edges of the first electrode to said second electrode with said sealant such that said space d and common area A between the first electrode and second electrode, drawing a vacuum between the space d and common area A to the first electrode and second electrode.

7. The method of claim 5, wherein the device is a gas capacitor is formed by, after sealing the remaining plurality of edges of the first electrode to said second electrode with said sealant such that said space d and common area A between the first electrode and second electrode, inserting a gas between the space d and common area A to the first electrode and second electrode.

8. The method of claim 5, wherein the device is at least one of a capacitor, inductor, impedance transformer, ring circulator and stripline component.

* * * * *